United States Patent

Byrum et al.

[11] Patent Number: 5,080,313
[45] Date of Patent: Jan. 14, 1992

[54] PIPE TO PLATE CONNECTION

[75] Inventors: Jackie W. Byrum, Newport News; William C. Hale, Gloucester Point; Randolph G. Herrmann, Tabb; Charles E. Moore, Newport News; Jack E. Vance, Suffolk, all of Va.

[73] Assignee: Newport News Shipbuilding and Dry Dock Company, Newport News, Va.

[21] Appl. No.: 341,828

[22] Filed: Apr. 24, 1989

[51] Int. Cl.5 .............................................. F16B 7/00
[52] U.S. Cl. .................................... 248/343; 248/188; 403/260
[58] Field of Search .................. 248/343, 317, 188; 403/293, 242, 245, 296, 258, 260, 274, 284

[56] References Cited

U.S. PATENT DOCUMENTS

| 1,460,928 | 7/1923 | Tilden | 403/260 X |
|---|---|---|---|
| 2,182,663 | 12/1939 | Eby et al. | |
| 3,822,456 | 7/1974 | Petruzzi | |
| 4,008,971 | 2/1977 | Wah et al. | 403/260 X |
| 4,083,641 | 4/1978 | Sado | 403/258 X |
| 4,667,916 | 5/1987 | Richards | 403/260 X |
| 4,735,390 | 4/1988 | Richards | |
| 4,793,580 | 12/1988 | Richards | |
| 4,826,343 | 5/1989 | Richards | 403/245 X |

FOREIGN PATENT DOCUMENTS

| 226905 | 2/1960 | Austria | 248/188 |
|---|---|---|---|
| 1345105 | 10/1963 | France | 248/188 |
| 1433287 | 2/1966 | France | 248/188 |
| 1010406 | 11/1965 | United Kingdom | 248/188 |

Primary Examiner—Karen J. Chotkowski
Attorney, Agent, or Firm—Lalos & Keegan

[57] ABSTRACT

A pipe to plate connection for attaching light stools to an overhead structure on ships. A stud gun welds a stud into a plate. The stud is threaded and is received into a cylindrical insert force fit into a length of pipe. The insert is threaded and receives the stud. The insert also has at least one external circumferential groove. Upon the cylindrical insert being force fit into the end of the pipe, the circumferential grooves are covered by the pipe. The pipe is swaged into the grooves of the insert. A tensile force between the pipe and the plate may be formed by a spring washer between the pipe and the overhead. The insert may have the outer surface deformed as by knurling to deform the inside of the pipe upon its insertion to aid in prevention of rotational movement between the insert and the pipe.

10 Claims, 2 Drawing Sheets

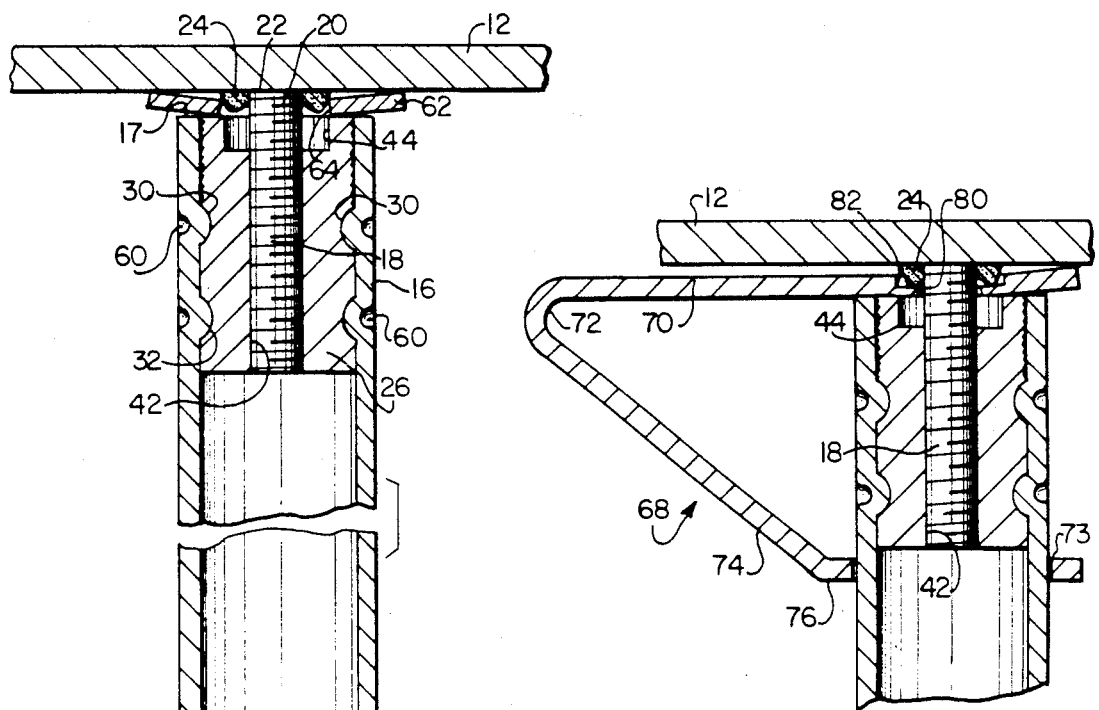
FIG. 5
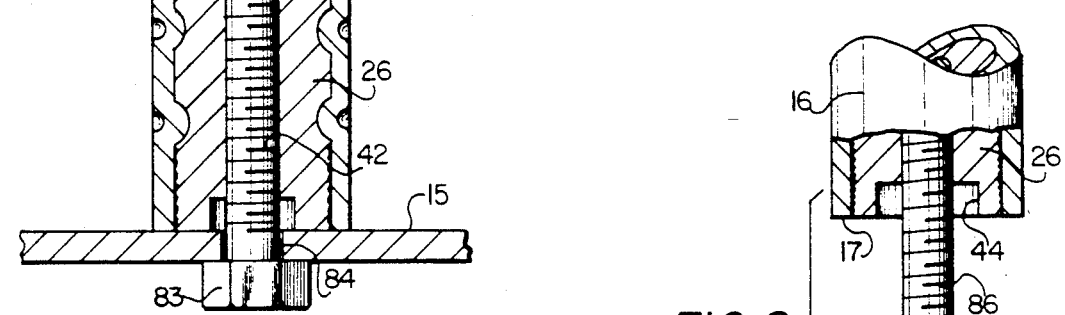
FIG. 6
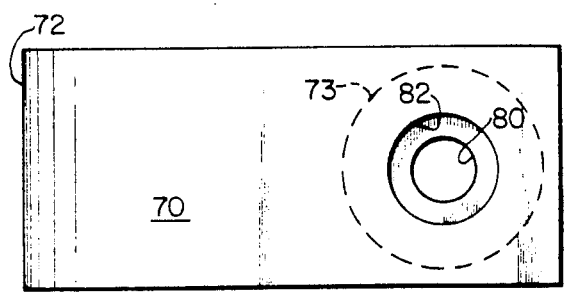
FIG. 7
FIG. 8

PIPE TO PLATE CONNECTION

INTRODUCTION

This invention relates generally to a pipe to plate connection that has many uses in industry. More particularly the present invention relates to both the method and the means for achieving a pipe to plate joint or connection or pipe to pipe coupling that may be used for any purposes in which a tubular member such as a pipe would be secured to a plate or any metallic surface. More particularly the present invention relates to a method and means for providing a light stool attached to an overhead structure at one end and having at the other end a lighting fixture.

BACKGROUND OF THE INVENTION

A method and apparatus for making a pipe to plate joint have been used in shipbuilding for various purposes such as supporting light fixtures. Light fixtures on ships are hung from the overhead at the ends of two lengths of pipe called "stools" in the trade. The stools are attached to the overhead structure by welding. Depending on the application, the weld may be a tack weld at a couple of points on the circumference of the stool, or a complete circumferential fillet weld. Depending on the method used, this may require one person to hold the stools to the overhead with a special jig while a welder tacks the stools to the structure. The jig supports the two stools to insure that they are positioned correctly to fit the light fixture. The jig is then removed and, if necessary, the stool welds are completed. If the overhead is of a special material, for example, high yield steel, special welding procedures must be followed to avoid a reduction in the characteristic qualities of the steel. These special procedures may be very cumbersome and time-consuming, requiring specially qualified welders and lengthy inspections and auditing steps. Some materials used for the overhead also require heating prior to welding which can be a very expensive additional procedure.

After the stool is welded to the overhead, a piece of flat bar is attached to the lower end of the stool by any appropriate method. For example, the flat bar may be welded to the stool in advance, or may be attached later by welding or other appropriate method.

The light fixture, for example, a fluorescent fixture, is then attached to the flat bar by conventional means. Depending on the size of the fixture, one or more stools may be used; if only one, a jig may not be necessary. The length of the stool(s) will depend on the standoff desired from the overhead.

In certain shipbuilding applications, it may be required to move the fixture at some later time. To accomplish this movement, stools must be cut from the overhead, and the welds ground until smooth. If the overhead is of a special material, cumbersome weld repair, inspection and auditing steps may again be required.

The prior art has made attempts to provide plate and pipe joints to form an overhead hanger and such has been disclosed in the recent U.S. Pat. No. 4,667,916 issued May 26, 1987. Each of the disclosed forms of the patented invention represent notable disadvantages in that they require significantly more swaging of the pipe. For instance, in the patented embodiments the pipe must be swaged both above and below the insert and actually reduced in diameter or to two different diameters. Such a swaging would require a significantly heavier press and would take significantly greater time. Further, the patented invention exhibits a disadvantage of having the insert either positioned accurately in the pipe for a one-step swaging operation which slows down the operation or a lower swage must be made and the insert pushed in the pipe and thereafter an upper swage made, obviously these steps require more cumbersome operation. Further disadvantages of the patented invention are that there may be insufficient capture of the insert to prevent rotational movement. Further in one of the embodiments of the patented invention, the pipe stool must be threaded internally, which when considering different lengths of pipe that may be required, would be a more cumbersome process than simply threading the inserts. Such threads on the pipe would also weaken the wall of the pipe stool and form stress risers.

OBJECTS OF THE INVENTION

The present invention has for a principal object the provision of a method and means for attaching a pipe to a plate to form a shock resistant stable joint or a coupling.

A more particular object of the present invention is the provision of means and method for forming a secure attachment of the light stool to an overhead structure, particularly on board ship.

Another object of the present invention is to provide a means and a method for attaching an object at a distance from a metallic surface such as achieving the standoff desired for a light fixture from an overhead.

Another object of the present invention is the provision of means and method for connection of the pipe to any flat metallic surface or to another pipe.

These and other objects of the present invention become more apparent upon review of the specification and the drawings which include the following.

DRAWINGS

FIG. 5 is a cross-sectional view taken along 5—5 of FIG. 1 and illustrating a stud welded to the overhead and a pipe having an insert positioned in both ends as well as the threaded bore of each insert receiving the stud and a fastener for the lighting fixture respectively. A spring washer is shown to provide a tensile force between the end of the pipe and the overhead.

FIG. 6 is a cross-sectional view partly broken away of an alternative means for providing a tensile force between the end of the pipe and the overhead.

FIG. 7 is another view of the alternate embodiment of FIG. 6.

FIG. 8 is a view of a pipe to pipe connection using the concepts of the present invention with a threaded rod for receipt in the inserts.

SUMMARY OF THE INVENTION

A pipe to plate connection for attaching light stools to an overhead structure on ships. A stud is welded as by a stud gun into a plate. The stud is threaded along its length. A length of pipe having an internal surface has a cylindrical insert force fit into the pipe. The insert is provided with a longitudinal threaded bore complementary to the threads on the stud. The insert also is provided with at least one external circumferential groove extending around the outer surface of the insert. When the cylindrical insert is force fit into the end of the pipe, the circumferential grooves are covered by the pipe. The external surface of the pipe is swaged or otherwise deformed so as to project the pipe into the groove. The pipe having the insert is then connected to the threaded stud to be held tightly against the plate to form a secure connection.

To provide a tensile force between the pipe and the plate, a spring washer may be inserted therebetween so that as the pipe is screwed onto the stud to come in contact with the spring washer, the tensile force will be achieved. Additionally, the outer surface of the insert may be deformed as by knurling in order to deform the inside of the pipe into which the insert is forced so as to further aid in the prevention of rotational movement between the insert and the pipe.

DESCRIPTION OF THE PREFERRED EMBODIMENT

Figure 1:
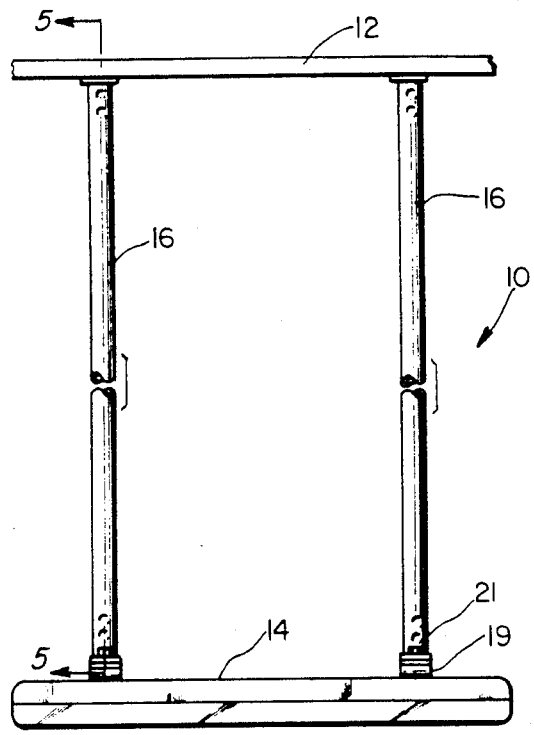
FIG. 1 is a side view partly broken away of a light fixture provided with a desired standoff from an overhead structure.
Figure 2:
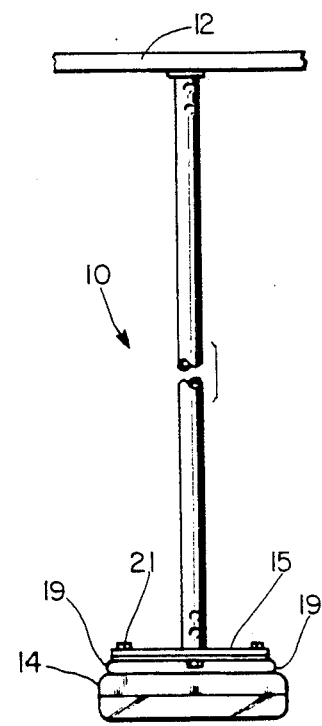
FIG. 2 is a side view of the present invention as shown in FIG. 1, also partly broken away illustrating the light fixture spaced from the overhead.

As shown in FIGS. 1 and 2, the present invention is generally depicted at 10 and includes a plate 12, which may be the steel overhead of a ship, to which the lighting fixture 14 is desired to be attached. Even if the steel overhead is of a special quality or possesses particular characteristics typically found on a naval ship, this invention demonstrates a safe and easy way of hanging a lighting fixture.

The spacing or standoff between the lighting fixture and the plate 12 is selected to meet any requirement. To meet the desired standoff, a metal pipe or stool 16 that may be in pairs, as shown in FIG. 1, or singly for smaller lighting fixtures, is of a chosen and desired length for securing the lighting fixture 14. To attach the stool or pipe 16 to the overhead plate 12, the first step is to weld a stud 18 to the plate, as shown in FIG. 5.

Stud welding of the stud as by an arc welding stud gun is well known in the art and forms no part of the present invention. The term "stud welding" as used herein should be interpreted as generally encompassing all methods of end welding of a stud. It is preferable, however, that an arc stud welding gun be utilized because of the ease that a firmly welded stud can be achieved. The stud gun of conventional design holds the stud in the gun and creates a dc arc between the end of the stud 20 and the faying surface 22 of the plate 12 to form a weld pool into which the gun projects the stud. The entire operation is conventionally done automatically without control by the operator except by actuation of the gun. The result of the stud arc weld is shown in FIG. 5 and typically produces a weld bulge 24 surrounding the stud 18 at the joining of the stud with the plate 12. Once the stud has been welded in place then the pipe 16 can be readied for attachment. It should be understood that while the stud is preferably welded to the plate 12 by means of the stud gun, it is possible, although a much less desirable alternative, to utilize typical fillet welds or any other means of attachment that would be stable. However, the special preparation, inspection and auditing necessary for fillet welding are eliminated in stud welding. A jig may still be desirable for locating the studs, but it is much simpler and less cumbersome than with the prior methods. All that is required is merely a length of stock notched at one end to fit the previously welded stud and formed at the other end with means to locate the stud gun at the correct spacing.

In order to position and secure the stool or pipe 16 onto the stud 18 it is necessary to provide the pipe 16 with an insert 26 as best shown in FIGS. 3, 4, 5 and 6. The insert 26 is formed of metal and is provided with an outside diameter approximately equal to or greater than the internal diameter of the pipe 16 so that upon insertion of the insert 26 into the end of the pipe 16, a force fit or interference fit would result.

The outer surface 28 of the insert is provided with one or more grooves 30 and 32 that are preferably, though not necessarily, entirely encompassing the circumference. While one groove may be adequate for the purposes of the present invention, it has been found that at least two are more preferable to effect the purposes of capturing the insert within the pipe. The grooves do not have to be of great depth and can be equal in depth or less than the width of the groove. The positioning of the circumferential grooves 30 and 32 axially along the insert is also not critical to the purposes of the present invention.

Figure 3:
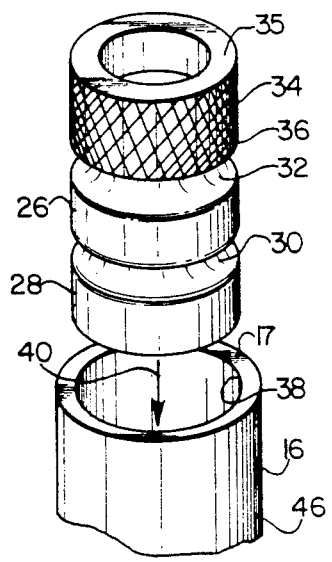
FIG. 3 is a perspective view partly broken away of a portion of a pipe stool and the insert about to be force fit into one end of the pipe. Also illustrated on the outer surface of the insert are the circumferential grooves and the deformation of the surface in a form of knurling.

Also positioned on the outer surface of the insert are deformations 34 that may be in the form of knurling or other methods of distressing the outer surface 28 of the insert to provide sharp or biting edges 36 that are able to penetrate into the inner surface 38 of the pipe 16 after being force fit down into the end of the pipe 16 as shown in FIG. 3 by the direction of the arrow 40.

Figure 4:
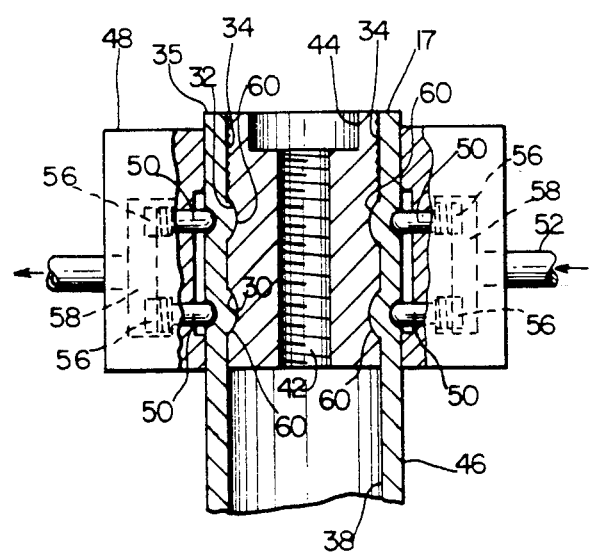
FIG. 4 is a cross-sectional view of an insert inserted into one end of the pipe following the operation shown in FIG. 3 and also showing schematically the use of hydraulically operated plural dies to swage the outer surface of the pipe into the grooves formed in the outer surface of the insert.

The insert is provided with an internal threaded bore 42 as best shown in FIGS. 4 and 5 and a concentric counterbore 44 designed to be of such diameter as to encompass, or not interfere with, the weld bulge 24, as best shown in FIG. 5.

After the insert 26 is force fit into the end of the pipe 16, the effect will be that the deformation 34 on the outer surface of the insert 26 will deform and distress the inside surface 38 of the pipe 16 so that the insert will bite or penetrate into the inner surface 38. The insert therefore will be held tightly against rotation.

Once the insert is force fit into the end of the pipe 16, it is desirable to retain the insert within the pipe in one of the simplest and easiest methods available. Accordingly, the outside surface 46 of the pipe 16 is swaged or otherwise deformed to force the pipe into the grooves 30 and 32 by the means of hydraulic jack 48 shown schematically in FIG. 4. The type of hydraulic jack that could be used is not a portion of the present invention and any type of hydraulic jack could be used such as are disclosed in U.S. Pat. No. 2,182,663 as well as U.S. Pat. No. 3,822,456.

As schematically shown, the rams 50 are actuated by the hydraulic fluid entering at inlet 52 and exiting at 54 wherein pistons 56 operate within chamber 58 to force ram 50 into the outer surface 46 of pipe 16 to deform the outer surface and therefore the pipe as shown at 60 into the circumferential grooves 30 and 32 as clearly shown in FIG. 4. When the pipe 16 is deformed in this manner into the grooves 30 and 32, whether continuously throughout the groove or only in the location of one application of the jack 48, the insert is locked longitudinally within the pipe.

When the insert is force fit into the pipe 16 in the manner previously described, it is desirable for the insert to be inserted to the extent that the pipe 16 covers the grooves 30 and 32 and that the deformation 34 are sufficiently inserted into the pipe that the insert is at least at the level of the pipe as best shown in FIG. 4 where the tops 17 and 35 of the pipe and the insert, respectively are coterminous.

In FIG. 5, there is shown the next step in securing the pipe or stool 16 to the plate or overhead 12. The insert 26 is inserted into the pipe 16 and the outer surface of the pipe is swaged to deform the pipe as shown by the deformation 60 into the grooves 30 and 32. The stool with the insert is now ready to be screwed up on the stud 18. It has been found that it is desirable to provide a tensile force between the plate 12 and the stool 16 which is best able to be achieved by use of a washer, such as shown at 62. The washer is a spring washer that may be of the Belleville type. When utilized as shown in FIG. 5, the stool is screwed up on the stud 18 to compress the washer 62 and provide a tensile force on the stud 18 between the plate 12 and the stool 16. The purpose of the washer and its production of tensile force is to take up any loose play that could result from any elongation of the stud due for example to lateral movement of the stool from vibration or shock. The washer 62 may be sized to suit the application and the diameter of the stud. In the embodiment shown in FIG. 5, the washer has a center opening 64 that is large enough to accommodate or surround the weld bulge 24 at the base of the threaded stud. The washer can be of any generally concave/convex configuration of which the Belleville pattern shown in FIG. 2 is but an example.

When the stool 16 is tightened down on the washer sufficiently to flatten the washer 62, the tensile force is applied to the stud 18. A simple pipe wrench may be used to rotate the stool 16 so as to compress the washer 62. Should the stud 18 subsequently be stretched plastically, as by a lateral loading on the stool, the washer 62 will take up any play that might otherwise result. The tensile force provided by washer 62 serves to keep the joint structurally tight, so that the light fixture does not move or swing and that an electrically tight connection is made between the top 17 of the stool and the washer and the plate 12 so as to maintain a proper grounding for the electrical circuit. As insurance to achieve proper grounding, a conventional conductive paste may be applied to all mating surfaces.

An alternative to the spring washer 62 for providing the desirable tensile force between the plate 12 and stool 16, FIG. 6 illustrates an optional embodiment of the invention that is in every way identical to that previously disclosed except for the use of the V-shaped bracket 68. This V-shaped bracket substitutes for the Belleville-type washer 62 to provide the desirable tensile force on the stud 18.

The leg 70 of the bracket 68, as shown to be the top leg of the bracket, is designed to lie up against the overhead 12. The leg 70 is bent at 72 to provide a downwardly inclined leg 74 terminating in a flat leg portion 76 having an opening 78 therethrough to receive the stool 16 as shown in FIG. 6. The top leg 70 preferably has a smaller bore 80 and a countersunk bore 82 to receive the weld bulge 24. The bore 80 is sized just large enough to fit over the stud 18. The bracket 68 is designed to provide stability for the stool as the stool is taken up on the stud 18 and the top leg 70 is flattened against the overhead 12.

The embodiments of FIGS. 5 and 6 provide a strong and tight connection that should be considered permanent. However, should it be necessary to take down the fixture or to move it, the present invention provides for such an eventuality by simply permitting the stool to be unscrewed from the stud and the stud may then be removed by striking it laterally with a hammer. The weld scar may then be ground away if that is necessary or desirable. If the overhead is of a special material, no procedures are required to repair the weld and inspect in order to repair as such welds are when formed by the usual fillet welding methods.

The lighting fixture may be secured as shown in FIGS. 1, 2 and 5 wherein the lighting fixture is shown at 14 held to the opposite end of the stool 16 with an insert 26 identical to that described previously and shown in the upper portion of FIG. 5. The insert and the means for holding the insert within the stool 16 are exactly the same as described in FIGS. 3, 4 and 5 previously. The bracket of FIG. 6 can be used in the same manner as previously disclosed at one end while at the other end, the lighting fixture bracket 15 can be secured to the opposite end of the stool 16 as shown at the bottom of FIG. 5. It is simply a matter of securing the lighting fixture bracket 15 to the bottom end of the stool 16 by a conventional bolt 83 that is screwed into the threaded bore 42 of the insert through opening 84. In such a manner as shown at FIGS. 1 and 2, the lighting fixture 14 can be securely fastened to the lighting fixture bracket 15 by the U-shaped clips 19 and nuts and bolts 21.

Additionally, it should be understood that the present invention may be used not only for a pipe to plate joint as has been described previously for purposes that may include supporting an object from the metallic surface or overhead in the form of plate 12 but it may also be used to make couplings between pipes or tubes. In such a desired occasion, as depicted in FIG. 8, an insert is inserted, as previously described, into the ends of tubes 16,16 that are to be connected. As shown in FIGS. 3, 4 and 5, the pipe 16 shown at the left of FIG. 8 would be receiving the same insert 26 as a confronting pipe or tube 16 shown at the right of FIG. 8 would be receiving. In such a case, the simple manner of connecting the two pipes or tubes would be to use a threaded rod 86 that would be the equivalent of a stud having both ends threaded. The threaded rod 86 would have one portion being screwed into the insert in one pipe and a second end of the rod would be screwed into the insert of the opposing tube as both tubes or pipes are screwed up onto the rod to face each other, at the time of contact between the tops 17,17 of the tubes a connection that is strong and stable will have been made.

It is believed that the foregoing description meets the objects of the invention as previously set forth and that the invention should be limited solely by the appended claims in which we claim:

1. A pipe to plate connection comprising,
   an elongated stud welded at one end to said plate and at the other end having threads positioned around the circumference of said stud, a length of pipe having an internal surface of a predetermined diameter, a cylindrical insert shorter in length than said pipe and having an outside diameter at least approximately equal to said internal surface diameter of said pipe, a means for applying a tensile force between said pipe and said plate so as to accommodate slack which may otherwise develop between the two, said insert having a longitudinal threaded bore complementary to the threads of said stud, said insert having at least one external circumferential groove extending around the outer surface of said insert, said cylindrical insert being received into one end of said pipe whereby said pipe covers said circumferential groove, said pipe having deformations being selectively received into said groove, said pipe having said insert therewithin being connected to said threaded stud whereby said one end of said pipe is held tightly against said plate to form a secure connection, said means for applying a tensile force comprising a generally V-shaped bracket, said bracket being formed from a flat bar and having a first leg and a second leg, said first leg being adapted to lie parallel to and in contact with said plate when in operative position, said first leg also having a circular opening at the distal end of the same size as said threaded stud and being slightly bent away from said second leg near said distal end, said second leg being bent at its distal end so that said second distal end is parallel to said plate, said second leg having a circular opening in its distal end of a size to receive said pipe, said bracket being placed with said first leg parallel to and in contact with said plate with said stud protruding through said opening in said first leg and having said pipe with said insert passed through said opening in said second leg and screwed onto said stud sufficient to flatten said bent first leg against said plate.

2. The connection of claim 1 including said outer surface of said insert having at least one surface deformation separate from said groove.

3. The connection of claim 2 wherein said surface deformation is knurling.

4. The connection of claim 1 wherein said insert is provided with two circumferential grooves for receiving the deformed portions of said pipe.

5. The connection of claim 1 wherein said groove is continuous around said outer surface.

6. An apparatus for use in supporting an object spaced from a metallic surface or plate comprising, an elongated stud welded at one end to said metallic surface or plate and at the other end having threads positioned around the circumference of said stud, a length of pipe having an internal surface of a predetermined diameter, a first cylindrical insert shorter in length than said pipe and having an outside diameter at least approximately equal to said internal surface diameter of said pipe, said insert having a longitudinal threaded bore complementary to the threads of said other end of said stud, said insert having at least one external circumferential groove extending around the outer surface of said insert, said cylindrical insert being received into one end of said pipe whereby said external surface of said pipe covers said circumferential groove, said pipe having deformations being selectively received along said groove and into said groove, a second cylindrical insert being similarly force fit into the other end of said pipe, said pipe having said insert therewithin being connected to said threaded stud whereby said one end of said pipe is held tightly against said metallic surface to form a secure connection, fastening means positioned between said object and said other end of said pipe to secure said object to the other end of said pipe, a means for applying a tensile force between said pipe and said metallic surface so as to accommodate slack which may otherwise develop between the two, said means for applying a tensile force comprising a generally V-shaped bracket, said bracket being formed from a flat bar and having a first leg and a second leg, said first leg being adapted to lie parallel to and in contact with said metallic surface when in operative position, said first leg also having a circular opening at the distal end of the same size as said threaded stud and being slightly bent away from said second leg near said distal end, said second leg being bent at its distal end so that said second distal end is parallel to said metallic surface, said second leg having a circular opening in its distal end of a size to receive said pipe, said bracket being placed with said first leg parallel to and in contact with said metallic surface with said stud protruding through said opening in said first leg and having said pipe with said insert passed through said opening in said second leg and screwed onto said stud sufficient to flatten said bent first leg against said metallic surface.

7. The connection of claim 6 including said outer surface of said insert having at least one surface deformation separate from said groove.

8. The connection of claim 7 wherein said surface deformation is knurling.

9. The connection of claim 6 wherein said insert is provided with two circumferential grooves for receiving the deformed portions of said pipe.

10. The connection of claim 6 wherein said groove is continuous around said outer surface.

* * * * *